(12) United States Patent
Sato

(10) Patent No.: US 7,403,614 B2
(45) Date of Patent: Jul. 22, 2008

(54) ENCRYPTION APPARATUS

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 869 days.

(21) Appl. No.: 10/633,658

(22) Filed: Aug. 5, 2003

(65) Prior Publication Data

US 2004/0076292 A1    Apr. 22, 2004

(30) Foreign Application Priority Data

Aug. 22, 2002    (JP) ............................. 2002-241367

(51) Int. Cl.
  *H04K 1/00*    (2006.01)
(52) U.S. Cl. .......................................... 380/30; 380/28
(58) Field of Classification Search ....................... None
  See application file for complete search history.

(56) References Cited

U.S. PATENT DOCUMENTS

| | | | |
|---|---|---|---|
| 5,764,772 A * | 6/1998 | Kaufman et al. ............... | 380/30 |
| 6,434,699 B1 | 8/2002 | Jones et al. | |
| 6,625,592 B1 * | 9/2003 | Dyer et al. ..................... | 707/2 |
| 6,728,378 B2 * | 4/2004 | Garib .......................... | 380/259 |
| 6,735,611 B2 | 5/2004 | Vanstone | |
| 6,986,044 B1 * | 1/2006 | Inada .......................... | 713/170 |
| 2002/0016917 A1 * | 2/2002 | Kitamura ..................... | 713/189 |

FOREIGN PATENT DOCUMENTS

| | | |
|---|---|---|
| JP | 07-036672 | 2/1995 |
| JP | 11-109859 | 4/1999 |
| JP | 2001-520775 | 10/2001 |
| JP | 2002-505451 | 2/2002 |
| WO | WO 02/48857 A2 | 6/2002 |

* cited by examiner

*Primary Examiner*—Kambiz Zand
*Assistant Examiner*—Roderick Tolentino
(74) *Attorney, Agent, or Firm*—Oblon, Spivak, McClelland, Maier & Neustadt, P.C.

(57) ABSTRACT

An encryption apparatus for performing an encryption operation using a public key encryption technique includes a public key encryption processor for performing an encryption operation using a public key encryption technique, a hash value generator for generating a hash value which is used by the public key encryption processor, and a storage unit for storing the generated hash value. When the hash value generator accesses the storage unit, at least other arithmetic operations performed by the public key encryption processor are suppressed. With the reduced instantaneous power consumption, high-speed and high-security signature generation and authentication using a public key is achieved.

20 Claims, 14 Drawing Sheets

ENCRYPTION APPARATUS

BACKGROUND OF THE INVENTION

1. Field of the Invention

The present invention relates to an encryption apparatus for performing an encryption process according to a public key encryption algorithm.

2. Description of the Related Art

Recently, a variety of services using various communication technologies, such as electronic commerce or on-line shopping over the Internet or the like, have become popular. With the growth of communication technologies, terminal-based communication systems and card-like devices including non-contact semiconductor memory cards having a communication function integrated into a circuit (these devices are hereinafter referred to as non-contact IC (integrated circuit) cards) have been developed for use in various situations such as electronic toll collection of transportation facilities and electronic money transactions.

In view of their convenience of handling, the non-contact IC cards must have a reduced circuit size and operate with very low power consumption.

The services using such non-contact IC cards generally require mutual authentication to authenticate the communicating parties and encryption to ensure data communication security. These functions must be performed at high speed in the non-contact IC cards. These functions, which are implemented by software, require a high-clock CPU (central processing unit), which is not suitable for practical use. Therefore, it is desirable that the mutual authentication function and the encryption function be implemented in the non-contact IC cards by hardware rather than software.

Most of the non-contact IC cards in which these functions are implemented by hardware employ so-called common key encryption algorithms, e.g., DES (data encryption standard), to reduce the consumption power because relatively reduced circuit size and power consumption of the non-contact IC cards are achievable. Some of the non-contact IC cards which employ the common key encryption algorithms typically have a communication distance of several centimeters to a reader/writer. Even a communication distance of as much as 10 cm can be realized, depending upon the type of interface.

However, in the common key encryption algorithms, a common key is used for both encoding and decoding, and so transmission and reception of key data are essential. Therefore, the common key encryption algorithms are vulnerable to attacks from unauthorized third parties. This has led to fears that the non-contact IC cards applied to financial services in the future may have problems.

In the services using non-contact IC cards, therefore, the demands for high security systems using so-called public key encryption algorithms, e.g., RSA (Rivest-Shamir-Adleman) and ECC (elliptic curve cryptosystem), have increased. In public key encryption, separate keys are used for encoding and decoding and a secret common key is kept by one particular individual. Many studies on non-contact IC cards for performing signature generation and authentication using public key techniques have been made.

Public key encryption algorithms have higher security than common key encryption algorithms, but require a large amount of calculation. Public key encryption algorithms implemented by hardware require circuits several tens of times larger than otherwise and also require a large amount of power supplied to such large circuits. Furthermore, concurrent calculations performed in circuits increase the instantaneous power of the circuits.

In the art, non-contact IC cards using the public key encryption algorithms have not achieved the desired characteristics in terms of circuit size, power consumption, and cost. In the current non-contact IC cards, most of the power must be supplied to an encryption circuit, and the communication distance is as small as about several millimeters. In addition, when the instantaneous power exceeds a predetermined power limit, the calculations must be interrupted and must be performed again. This delays the operations in the non-contact IC cards.

FIGS. 14A through 14D are schematic graphs showing, for comparison, the consumption power for various operations and the total power consumption of the non-contact IC card. In the graphs shown in FIGS. 14A through 14D, the y-axis represents the consumption power W, and the x-axis represents the processing time T. FIG. 14A shows the consumption power of gates, FIG. 14B shows the consumption power for accessing an ALU RAM in which hash values are stored, and FIG. 14C shows the consumption power of a RAM. FIG. 14D shows the consumption power of the overall non-contact IC card, indicating the sum of the consumption powers shown in FIGS. 14A through 14C. The concurrent operations of the gates, the ALU RAM, and the RAM at processing time $t_0$, as shown in FIGS. 14A through 14C, may cause the consumption power for the overall non-contact IC card to exceed the power limit for an instant, as shown in FIG. 14D. If the power consumption for the overall non-contact IC card exceeds the power limit, the operations must be interrupted and performed again, and thus any operation carried out up to the time when the consumption power exceeds the power limit becomes wasteful.

Such wasteful operations each time the consumption power exceeds the power limit hinder high-speed processing of the non-contact IC card, leading to a serious problem because the non-contact IC card is demanded to perform processing at high speed. In particular, the instantaneous power consumption for a period of as short as several nanoseconds is large when accessing the ALU RAM, and other concurrent operations may cause the instantaneous power for the overall non-contact IC card to exceed the power limit, resulting in delay of the operations.

Although the demands for non-contact IC cards using public key encryption algorithms having high security robustness have increased, it is difficult to implement the algorithms because such non-contact IC cards have limitations on power supply, chip size, etc. It is also difficult to achieve high-speed processing due to the limitation on the power consumption.

SUMMARY OF THE INVENTION

The present invention has been made in view of such situations, and it is an object of the present invention to provide an encryption apparatus capable of high-speed and reliable signature generation and authentication using a public key while reducing the circuit size and the instantaneous power.

According to the present invention, an encryption apparatus for performing an encryption operation using a public key encryption technique includes a public key encryption processor for performing an encryption operation using a public key encryption technique; a hash value generator for generating a hash value which is used by the public key encryption processor; and a storage unit for storing the hash value. When the hash value generator accesses the storage unit, at least other arithmetic operations performed by the public key encryption processor are suppressed. During a relatively high power consumption operation, other operations are temporarily limited, thus reducing the instantaneous power. With the reduced instantaneous power peaks, high-speed and high-security signature generation and authentication using a public key is achievable.

In the encryption apparatus according to the present invention, the public key encryption processor may include a register group having a register for maintaining an arithmetic operation value and a register for storing a result, and the hash value generator may include a register group having a register for maintaining an arithmetic operation value and a register for storing the generated hash value. At least the register group of the public key encryption processor and the register group of the hash value generator may be shared, and the hardware may be switched in a time-shared manner depending upon the operation mode. The time-shared operations of hardware reduce the instantaneous power. Therefore, signature generation and authentication using a public key can be carried out in security while reducing the circuit size and the power consumption.

The encryption apparatus according to the present invention may further include a common key encryption processor for performing an encryption operation using a common key encryption technique to generate a random number for use in the encryption operation of the public key encryption processor, and the common key encryption processor may include a register group having a register for maintaining the resulting data and a register for maintaining key data. The register group of the common key encryption processor and the register group of the public key encryption processor may be shared.

Accordingly, the encryption apparatus according to the present invention can share a register group among the encryption operation of the public key encryption processor, the hash value generation of the hash value generator, and the encryption operation of the common key encryption processor in a time-shared manner. Therefore, the circuit size and the power consumption can be reduced.

In the encryption apparatus according to the present invention, the public key encryption processor may include a public key encryption arithmetic operation core unit for performing various arithmetic operations for public key encryption, and the hash value generator may include a hash value arithmetic operation core unit for performing various arithmetic operations for hash value generation. The public key encryption arithmetic operation core unit and the hash value arithmetic operation core unit may be shared.

In the encryption apparatus according to the present invention, the public key encryption arithmetic operation core unit may include an adder, and may share the adder with the hash value arithmetic operation core unit.

In the encryption apparatus according to the present invention, the public key encryption processor may include a bus switch for making the bit width variable. The public key encryption processor may share the bus switch with the hash value generator.

Accordingly, the encryption apparatus according to the present invention can share an arithmetic operation core unit for performing arithmetic operations between the encryption operation of the public key encryption processor and the hash value generation of the hash value generator in a time-shared manner, and also shares a bus switch between the encryption operation of the public key encryption processor and the hash value generation of the hash value generator in a time-shared manner. Therefore, the circuit size and the power consumption can be greatly reduced.

The encryption apparatus according to the present invention may further include a common key encryption processor for performing an encryption operation using a common key encryption technique to generate a random number for use in the encryption operation of the public key encryption processor, and the common key encryption processor may include a bus switch. The bus switch of the common key encryption processor and the bus switch of the public key encryption processor may be shared.

Accordingly, the encryption apparatus according to the present invention can share a bus switch among the encryption operation of the public key encryption processor, the hash value generation of the hash value generator, and the encryption operation of the common key encryption processor in a time-shared manner. Therefore, the circuit size and the power consumption can be reduced.

In the encryption apparatus according to the present invention, the hash value generator may store the generated hash value into the storage unit at an address which is used by the public key encryption processor, and the public key encryption processor may read the hash value stored in the storage unit.

Accordingly, in the encryption apparatus according to the present invention, the hash value generated by the hash value generator can be passed via the storage unit to the public key encryption processor for the subsequent encryption operation of the public key encryption processor without data transfer. Therefore, the circuit size and the power consumption can be reduced, and high-speed processing can also be achieved.

BRIEF DESCRIPTION OF THE DRAWINGS

FIGS. 1A through 1C are block diagrams showing the concept of an encryption apparatus according to an embodiment of the present invention, in which FIG. 1A shows functional hardware units in an ECC engine, FIG. 1B shows functional hardware units in an SHA-1 engine, and FIG. 1C shows a shared register group between the ECC processing and the SHA-1 processing;

FIGS. 7A and 7B are block diagrams showing the main portion of the ECC processing circuit, in which FIG. 7A shows a change of the bit width of a shift register group in which the number of shift registers is reduced from the rightmost shift register, and FIG. 7B shows a change of the bit width of a shift register group, in which the number of shift registers is reduced from the leftmost shift register;

FIGS. 12A through 12D are block diagrams for illustrating the time-shared processing of the non-contact IC card, in which FIG. 12A shows the operation in a communication mode, FIG. 12B shows the operation in an ECC mode, FIG.

12C shows the operation in a DES mode, and FIG. 12D shows the operation in an ALU RAM mode;

FIGS. 13A through 13D are graphs showing the consumption power of the non-contact IC card, in which FIG. 13A shows the consumption power of gates, FIG. 13B shows the consumption power for accessing an ALU RAM, FIG. 13C shows the consumption power of a RAM, and FIG. 13D shows the consumption power of the overall non-contact IC card; and FIGS. 14A through 14D are graphs showing the consumption power of a non-contact IC card of the related art, in which FIG. 14A shows the consumption power of gates, FIG. 14B shows the consumption power for accessing an ALU RAM, FIG. 14C shows the consumption power of a RAM, and FIG. 14D shows the consumption power of the overall non-contact IC card.

DESCRIPTION OF THE PREFERRED EMBODIMENTS

A specific embodiment of an encryption apparatus according to the present invention is described in detail with reference to the drawings.

In this embodiment, the encryption apparatus is applicable to, for example, card-like devices including non-contact semiconductor memory cards having a communication function integrated into a circuit (these devices are hereinafter referred to as non-contact IC (integrated circuit) cards). In this encryption apparatus, a mutual authentication function to authenticate the communicating parties and an encryption function to ensure data communication security are implemented by hardware. The encryption apparatus employs a public key encryption algorithm. When a hash value generated for encryption is stored, other operations are limited so as not to increase the instantaneous power, and high-speed and reliable signature generation and authentication using a public key are achievable with the reduced instantaneous power.

In the encryption apparatus, hardware for performing various operations is shared, and the operations are performed in a time-shared manner. This reduces the instantaneous power, and also reduces the circuit size to ensure high-speed and high-security signature generation and authentication using a public key with low power consumption.

In the following description, the elliptic curve cryptosystem (ECC) technique is used as the public key encryption algorithm, and the SHA-1 (Secure Hash Algorithm 1) technique is used as the hash function algorithm to be used for authentication or digital signature. In the following description, furthermore, the DES (data encryption standard) technique, which is a common key encryption algorithm, is used as a random number generation technique for use in key generation during encryption. Therefore, the encryption apparatus performs public key encryption signal processing using at least the ECC, SHA-1, and DES techniques.

The concept of shared hardware configuration of the encryption apparatus among the time-shared ECC, SHA-1, and DES operations is described below.

Figure 1A:
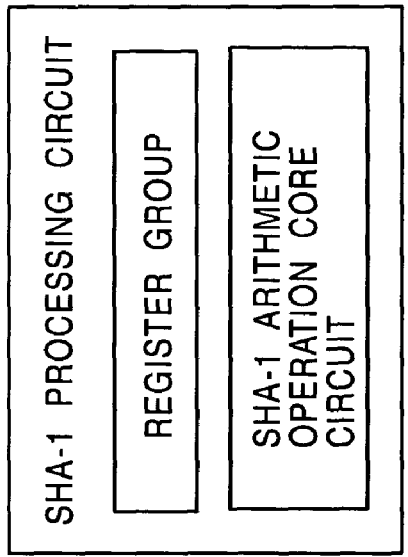
Figure 1B:
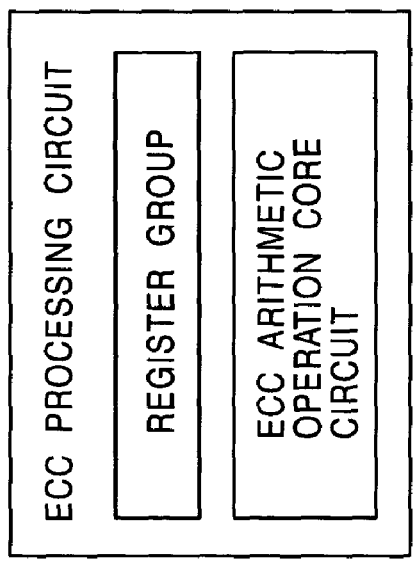
Figure 1C:
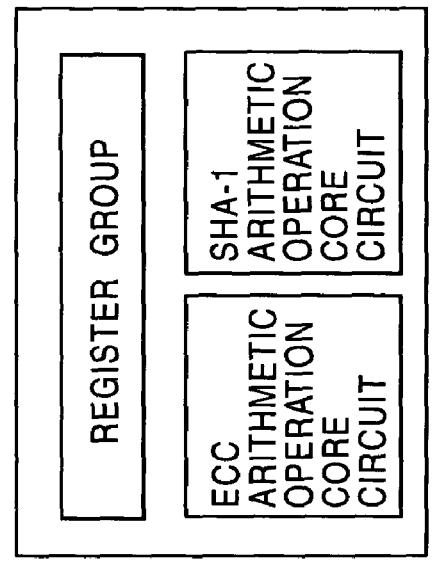

In the encryption apparatus, a register group as hardware is shared among the ECC, SHA-1, and DES operations. FIG. 1A shows the concept of an ECC engine (ECC processing circuit) for performing the ECC operation. In FIG. 1A, the ECC engine is formed of a register group and an ECC arithmetic operation core circuit as functional hardware units, and approximately half of the hardware for the ECC operation corresponds to the register group. FIG. 1B shows the concept of an SHA-1 engine (SHA-1 processing circuit) for performing the SHA-1 operation, and the SHA-1 engine is formed of a register group and an SHA-1 arithmetic operation core circuit as functional hardware units. In the encryption apparatus shown in FIG. 1C, a register group is shared among the ECC and SHA-1 operations. Although not shown in the figures, a DES engine for performing the DES operation is also formed of a register group and a DES arithmetic operation core circuit as functional hardware units. In the encryption apparatus, therefore, a register group can be shared among the ECC, SHA-1, and DES operations. This reduces the circuit size of the encryption apparatus.

In the encryption apparatus, the SHA-1 arithmetic operation core circuit and the ECC arithmetic operation core circuit may also be shared. The SHA-1 arithmetic operation core circuit requires a high-speed adder to determine hash values. The ECC arithmetic operation core circuit also includes an adder. Therefore, multiple-gate hardware, such as an adder, is shared between the SHA-1 arithmetic operation core circuit and the ECC arithmetic operation core circuit. This reduces the circuit size of the encryption apparatus.

In the encryption apparatus, bus switches of the encryption engines are also used as switches for switching other functions. In the public key encryption algorithm, a bus must be switched to make the key length variable, and the ECC engine includes multiple switches having a bit width of, for example, 32. The switches can be shared between the SHA-1 hardware and the DES hardware in view of their structure. The encryption apparatus uses the bus switches as switches for switching other functions. This reduces the circuit size of the encryption apparatus.

In the encryption apparatus, hardware units, such as a register and a memory, may also be time-shared. The public key encryption signal processing of the encryption apparatus includes random number generation using the DES technique, hash value generation using the SHA-1 technique, and elliptic curve determination using the ECC technique. These operations cannot be concurrently performed, and so time-shared processing is essential to hardware sharing. Using this principle, hardware, such as the register and the memory, is time-shared among the operations in the encryption apparatus. This reduces the circuit size of the encryption apparatus and also reduces the consumption power.

In the encryption apparatus, accordingly, the hardware is shared among the ECC, SHA-1, and DES operations, and the operations are performed in a time-shared manner.

In the encryption apparatus, it is desirable that the hardware be easily shared among the ECC, SHA-1, and DES operations for implementation. A specific example of hardware sharing among the ECC, SHA-1, and DES operations is described first, followed by a specific example of the encryption apparatus having the shared hardware configuration.

First, an SHA-1 processing circuit as hardware for performing the SHA-1 operation is described.

The SHA-1 processing circuit performs the SHA-1 operation. The SHA-1 technique is one of the hash function algorithms for use in authentication or digital signature, and uses an irreversible unidirectional function to produce 160-bit pseudo-random-number hash values from any 512-bit original message. In the SHA-1 technique, different hash values are produced from even one-bit different messages. Thus, the SHA-1 technique is commonly used to determine whether or not the original message is tampered during communication by comparing the originating hash value with the generated hash value at both ends of the communication link. In the SHA-1 operation, more specifically, an originator sends both a message and a hash value corresponding to this message, and a receiver generates a hash value from the received message. The hash value generated by the receiver is compared to the hash value sent from the originator to determine whether or not the data is tampered. As used herein, the SHA-1 processing circuit which performs such an SHA-1 operation employs "ALTERNATIVE METHOD" specified by FIPS (Federal Information Processing Standard), which requires a relatively small circuit.

The "ALTERNATIVE METHOD" algorithm is an alternative implementation method of the SHA-1 operation in a smaller memory space using a sequence of 16 32-bit words W(0), . . . and W(15), wherein {W(t)} is regarded as a circular cue, while a standard method uses a sequence of 80 32-bit words W(0), . . . and W(79). In this algorithm, the following four steps are performed on every block M(i) having a bit length of 512. It is assumed herein that value MASK is hexadecimal 0000000F.

In the first step of the algorithm, the block M(i) is divided into 16 words W(0), . . . , and W(15). The word W(0) indicates the leftmost word.

In the second step of the algorithm, if the initial word buffers are indicated by A, B, C, D, and E and the next word buffers are indicated by H0, H1, H2, H3, and H4, the following Equation (1) is determined:

$$\begin{cases} A = H0; \\ B = H1; \\ C = H2; \\ D = H3; \\ E = H4; \end{cases} \quad (1)$$

In the third step of the algorithm, the following Equation (2) is determined while variable t is set to 0 to 79:

$$\begin{cases} s = t \text{ AND MASK}; \\ \text{if } (t \geq 16) \\ W[s] = S1(W[(s+13) \text{ AND MASK}] \text{ XOR } W[(s+8) \text{ AND MASK}] \\ \qquad\qquad \text{XOR } W[(s+2) \text{ AND MASK}] \text{ XOR } W[s]); \\ TEMP = S5(A) + F(t; B, C, D) + E + W[s] + Kt; \\ E = D; \\ D = C; \\ C = S30(B); \\ B = A; \\ A = TEMP; \end{cases} \quad (2)$$

In Equation (2), Sn(X) indicates the circular left shift operation, where X denotes a word and n denotes an integer with 0≦n<32. In Equation (2), F(t; B, C, D) is a function defined by the following Equation (3), and K(t) denotes a hexadecimal word constant string defined by the following Equation (4):

$$\begin{cases} F(t; B, C, D) = (B \text{ AND } C) \text{ OR } ((\text{NOT } B) \text{ AND } D) \\ \qquad\qquad (0 \leq t \leq 19) \\ F(t; B, C, D) = B \text{ XOR } C \text{ XOR } D \\ \qquad\qquad (20 \leq t \leq 39) \\ F(t; B, C, D) = (B \text{ AND } C) \text{ OR } (B \text{ AND } D) \text{ OR } (C \text{ AND } D) \\ \qquad\qquad (40 \leq t \leq 59) \\ F(t; B, C, D) = B \text{ XOR } C \text{ XOR } D \\ \qquad\qquad (60 \leq t \leq 79) \end{cases} \quad (3)$$

-continued $$\begin{cases} K(t) = 5A82799 & (0 \leq t \leq 19) \\ K(t) = 6ED9EBA1 & (20 \leq t \leq 39) \\ K(t) = 8F1BBCDC & (40 \leq t \leq 59) \\ K(t) = CA62C1D6 & (60 \leq t \leq 79) \end{cases} \quad (4)$$

In the fourth step of the algorithm, the following Equation (5) is determined:

$$\begin{cases} H0 = H0 + A; \\ H1 = H1 + B; \\ H2 = H2 + C; \\ H3 = H3 + D; \\ H4 = H4 + E; \end{cases} \quad (5)$$

Then, the series of steps ends.

Figure 2:
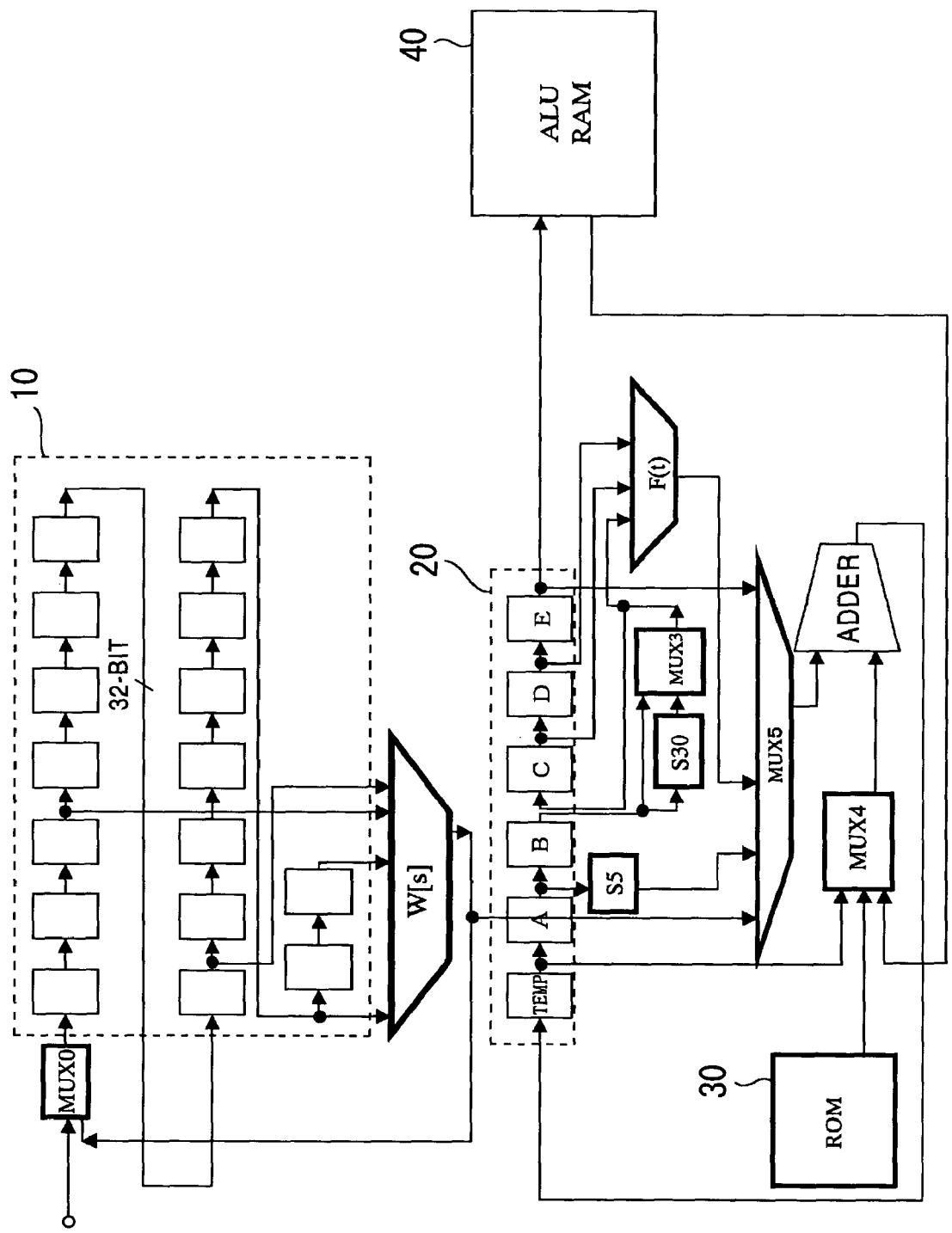
FIG. 2 is a block diagram of a specific SHA-1 processing circuit.

FIG. 2 illustrates an SHA-1 processing circuit in which the "ALTERNATIVE METHOD" algorithm is implemented in a general form.

The SHA-1 processing circuit shown in FIG. 2 includes a shift register group 10 for temporarily storing arithmetic operation values supplied from a CPU (central processing unit) (not shown); a shift register group 20 having five shift registers corresponding to the word buffers A, B, C, D, and E, and a shift register for storing the value TEMP for storing a generated hash value; a ROM (read only memory) 30 for storing the initial values H0, H1, H2, H3, and H4, and the hexadecimal word constant string K(t) given by Equation (4); and an ALU RAM (arithmetic and logical unit random access memory) 40 for storing the resulting hash value. The SHA-1 processing circuit further includes various arithmetic operation circuits for performing the arithmetic operations in the algorithm described above. FIG. 2 also shows bus switches MUX0, MUX3, MUX4, and MUX5.

In the SHA-1 processing circuit, a 32-bit five-input adder for determining the value TEMP given by Equation (2) or for determining the following Equation (6) causes an increase of the circuit size of the SHA-1 processing circuit:

$$TEMP=S5(A)+F(t;B,C,D)+E+W[s]+Kt; \quad (6)$$

Figure 3:
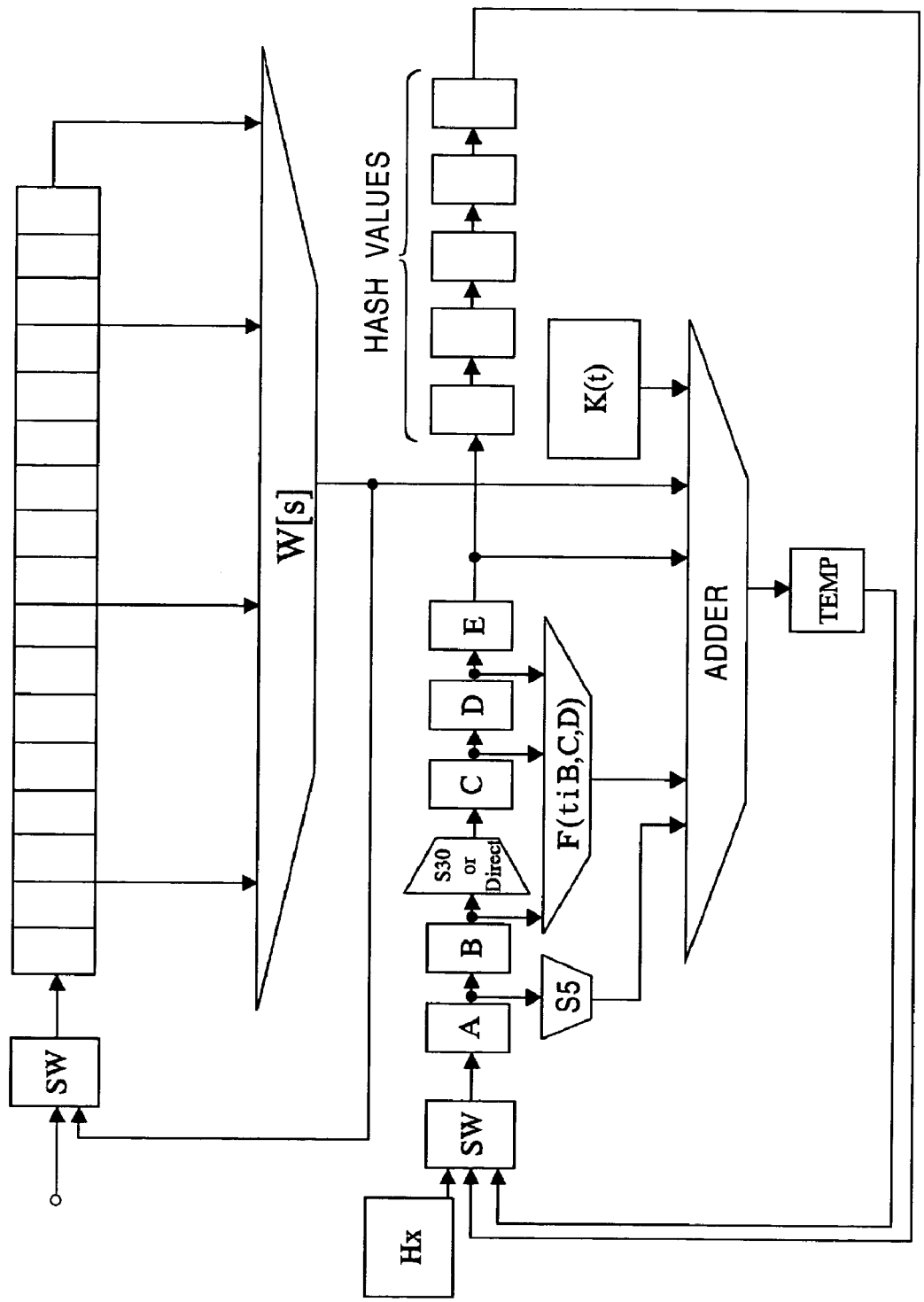
FIG. 3 is a block diagram of another specific SHA-1 processing circuit.

Since the time required for the SHA-1 arithmetic operation is negligibly shorter than the time required for the ECC arithmetic operation, the SHA-1 processing circuit uses a 32-bit two-input adder four times, as shown in FIG. 3, thus reducing the circuit size of the SHA-1 processing circuit.

Although the SHA-1 processing circuit shown in FIG. 3 requires an operation time about four to five times as much as the SHA-1 processing circuit shown in FIG. 2, this causes no problem because the time required for the SHA-1 operation is much shorter than the time required for the ECC operation. Thus, desirable performance is achievable unless a large amount of data or large size stream is subjected to the SHA-1 operation.

The SHA-1 processing circuit does not require any adder if it uses an ECC adder described below, thus greatly reducing the circuit size of the SHA-1 processing circuit.

The SHA-1 processing circuit essentially requires a 16-stage 32-bit shift register for determining the word W[s] given by Equation (2) or determining the following Equation (7):

$$W[s]=S1(W[s+13] \text{ AND MASK }] \text{XOR } W[(s+8) \text{ AND MASK}] \text{XOR } W[(s+2) \text{ AND MASK}] \text{XOR } W[s]; \quad (7)$$

The SHA-1 processing circuit further requires at least a five- or six-stage 32-bit shift register for determining the word buffers A, B, C, D, and E give by Equation (2) or for determining the following Equation (8):

$$\begin{cases} E = D; \\ D = C; \\ C = S30(B); \\ B = A; \\ A = TEMP, \end{cases} \quad (8)$$

As described below, an ECC processing circuit as hardware for performing the ECC operation includes three sets of seven-stage 32-bit shift registers in which the number of stages is variable. If the SHA-1 processing circuit uses these shift registers, the SHA-1 processing circuit need not have any dedicated shift register, thus greatly reducing the circuit size of the SHA-1 processing circuit. In the encryption apparatus, consequently, the SHA-1 processing circuit can be implemented by adding approximately 2000 gates to the ECC processing circuit, whereas typical SHA-1 processing circuits require more than 60000 gates.

The basic operation of the SHA-1 processing circuit shown in FIG. 2 is described below with reference to the flowcharts shown in FIGS. 4 and 5.

Figure 4:
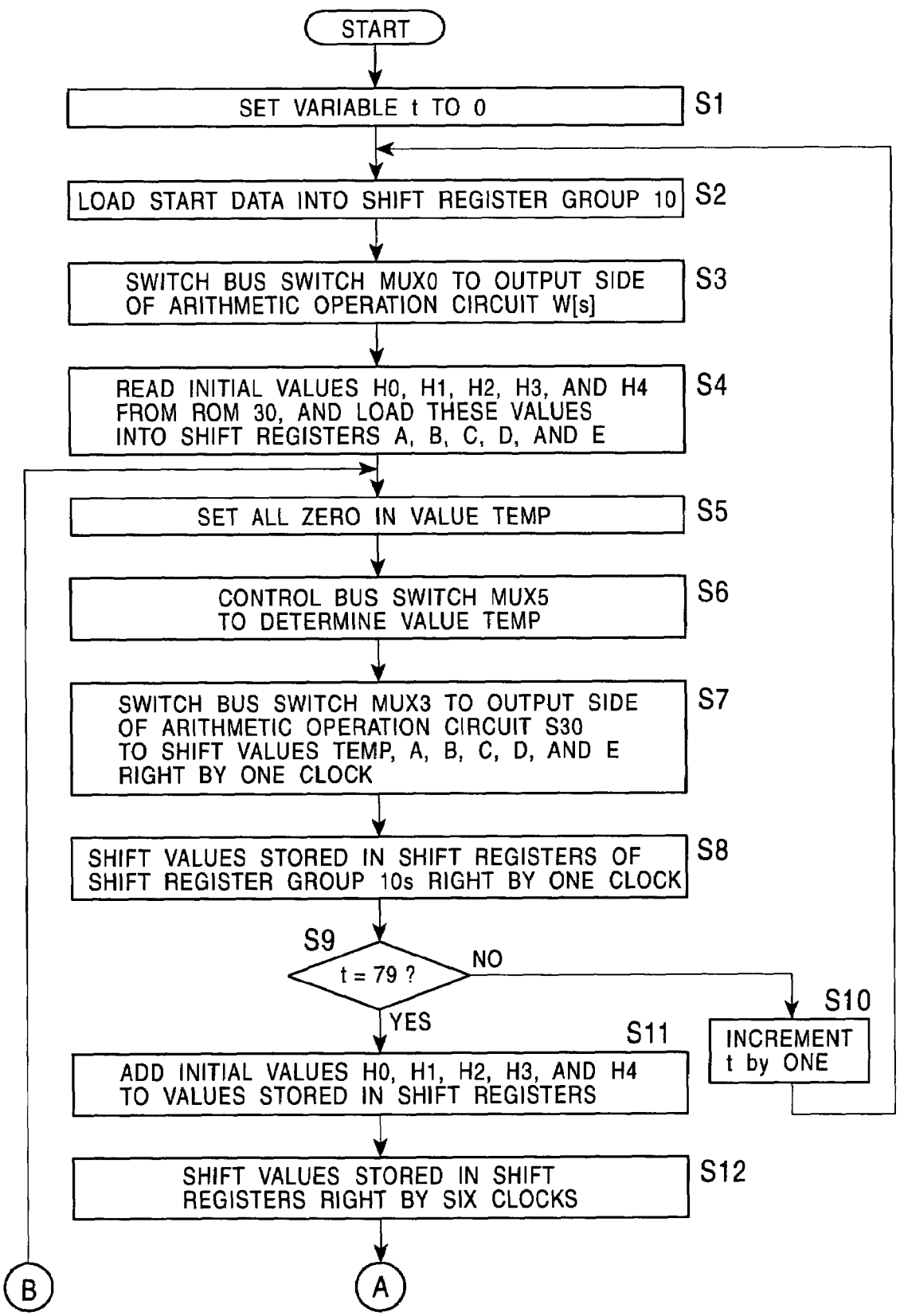
FIG. 4 is a flowchart showing the basic operation of the SHA-1 processing circuit shown in FIG. 2.

In FIG. 4, first, in step S1, the SHA-1 processing circuit sets the variable t to "0".

In step S2, the SHA-1 processing circuit loads the first 32×16 block (=512 bits) of data of the padded data into the corresponding shift registers of the shift register group 10.

In step S3, the SHA-1 processing circuit switches the us switch MUX0 to the output side of the arithmetic operation circuit W[s].

In step S4, the SHA-1 processing circuit reads the initial values H0, H1, H2, H3, and H4 from the ROM 30, and sequentially loads these values into the shift registers of the shift register group 20, corresponding to the word buffers A, B, C, D, and E, via the bus switch MUX4, the adder, and the shift register of the shift register group 20 which stores the value TEMP.

In step S5, the SHA-1 processing circuit sets all zero in the value TEMP.

In step S6, the SHA-1 processing circuit controls the bus switch MUX5 so that the adder performs addition four times, as given by the following Equation (9), to perform a calculation equivalent to Equation (6) to determine the value TEMP:

$$\begin{cases} S5(A) + F(t) \Rightarrow TEMP; \\ TEMP + E \Rightarrow TEMP; \\ TEMP + W[s] \Rightarrow TEMP; \\ TEMP + K(t) \Rightarrow TEMP, \end{cases} \quad (9)$$

In step S7, the SHA-1 processing circuit switches the bus switch MUX3 to the output side of the arithmetic operation circuit S30, so that the values TEMP, A, B, C, D, and E stored in the respective shift registers are shifted right by one clock. Then, the SHA-1 processing circuit determines the values given by Equation (8).

In step S8, the SHA-1 processing circuit shifts the values stored in the shift registers of the shift register group 10 right by one clock.

In step S9, the SHA-1 processing circuit determines whether or not the variable t has reached "79". If the SHA-1 processing circuit determines that the variable t has not reached "79", the process proceeds to step S10, in which variable t is incremented by "1", before returning to step S2 to repeat the operations up to step S8. The SHA-1 processing circuit repeats the operations of steps S2 through S8 with the variable t set to "0" to "79".

If the SHA-1 processing circuit determines that the variable t has reached "79", the process proceeds to step S11, in which the bus switch MUX3 is switched to the opposite side to the output side of the arithmetic operation circuit S30 and the bus switch MUX4 is switched to the output side of the ROM 30, thus allowing the output of the shift register corresponding to the word buffer E to become the output of the bus switch MUX5. The adder adds the initial values H0, H1, H2, H3, and H4 to the values stored in the shift registers corresponding to the word buffers A, B, C, D, and E, respectively.

The resulting values obtained in step S11 by the adder are supplied to the shift register which stores the value TEMP. In step S12, the SHA-1 processing circuit shifts the values stored in the shift registers right by six clocks to determine Equation (5).

Figure 5:
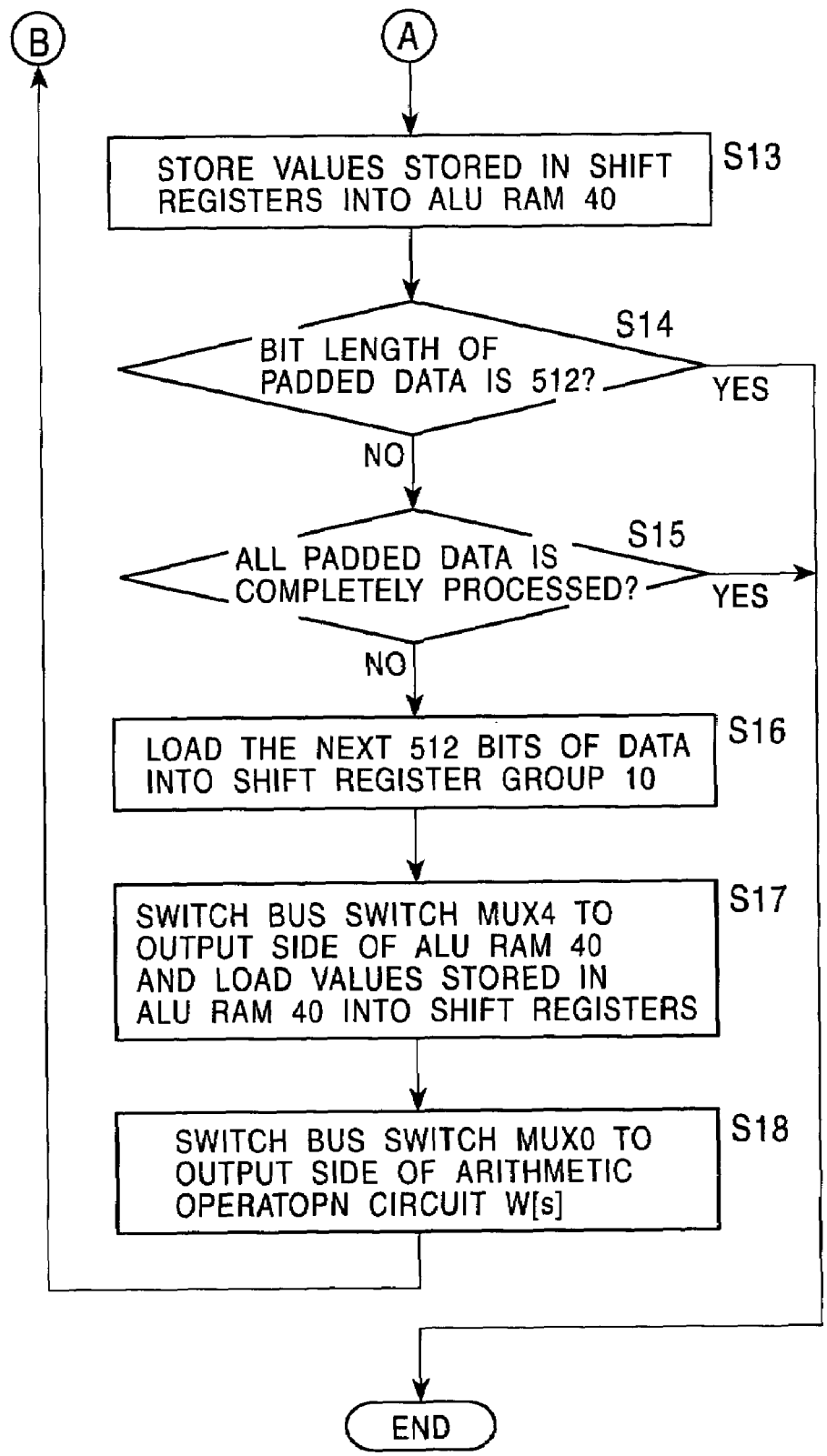
FIG. 5 is a flowchart of the basic operation of the SHA-1 processing circuit shown in FIG. 2, which follows the flowchart shown in FIG. 4.

In FIG. 5, in step S13, the SHA-1 processing circuit stores the values stored in the shift registers corresponding to the word buffers A, B, C, D, and E into the ALU RAM 40.

In step S14, the SHA-1 processing circuit determines whether or not the bit length of the padded data is 512.

If the SHA-1 processing circuit determines that the bit length of the padded data is 512, the values stored in the ALU RAM 40 in step S13 are the target hash values. Then, this process ends.

If the SHA-1 processing circuit determines that the bit length of the padded data is not 512 or is over 512, then, in step S15, it is determined whether or not all the padded data is loaded into the shift registers of the shift register group 10 and is completely processed.

If it is determined that all the padded data is not loaded into the shift registers of the shift register group 10 and is not completely processed, then, in step S16, the SHA-1 processing circuit loads the next 512 bits of data into the shift registers of the shift register group 10 while the values loaded in step S13 are still stored in the ALU RAM 40.

In step S17, the SHA-1 processing circuit switches the bus switch MUX4 to the output side of the ALU RAM 40 so that the values stored in the ALU RAM 40 in step S13 are loaded into the shift registers corresponding to the word buffers A, B, C, D, and E.

In step S18, the SHA-1 processing circuit switches the bus switch MUX0 to the output side of the arithmetic operation circuit W[s] to repeat the operations from step S5 of FIG. 4.

If the SHA-1 processing circuit determines in step S15 that all the padded data is loaded into the shift registers of the shift register group 10 and is completely processed, the values stored in the ALU RAM 40 in step S13 are the target hash values. Then, this process ends.

As a result of the above-described series of steps, the SHA-1 processing circuit generates the hash values.

Next, an ECC processing circuit as hardware for performing the ECC operation is described.

Figure 6:
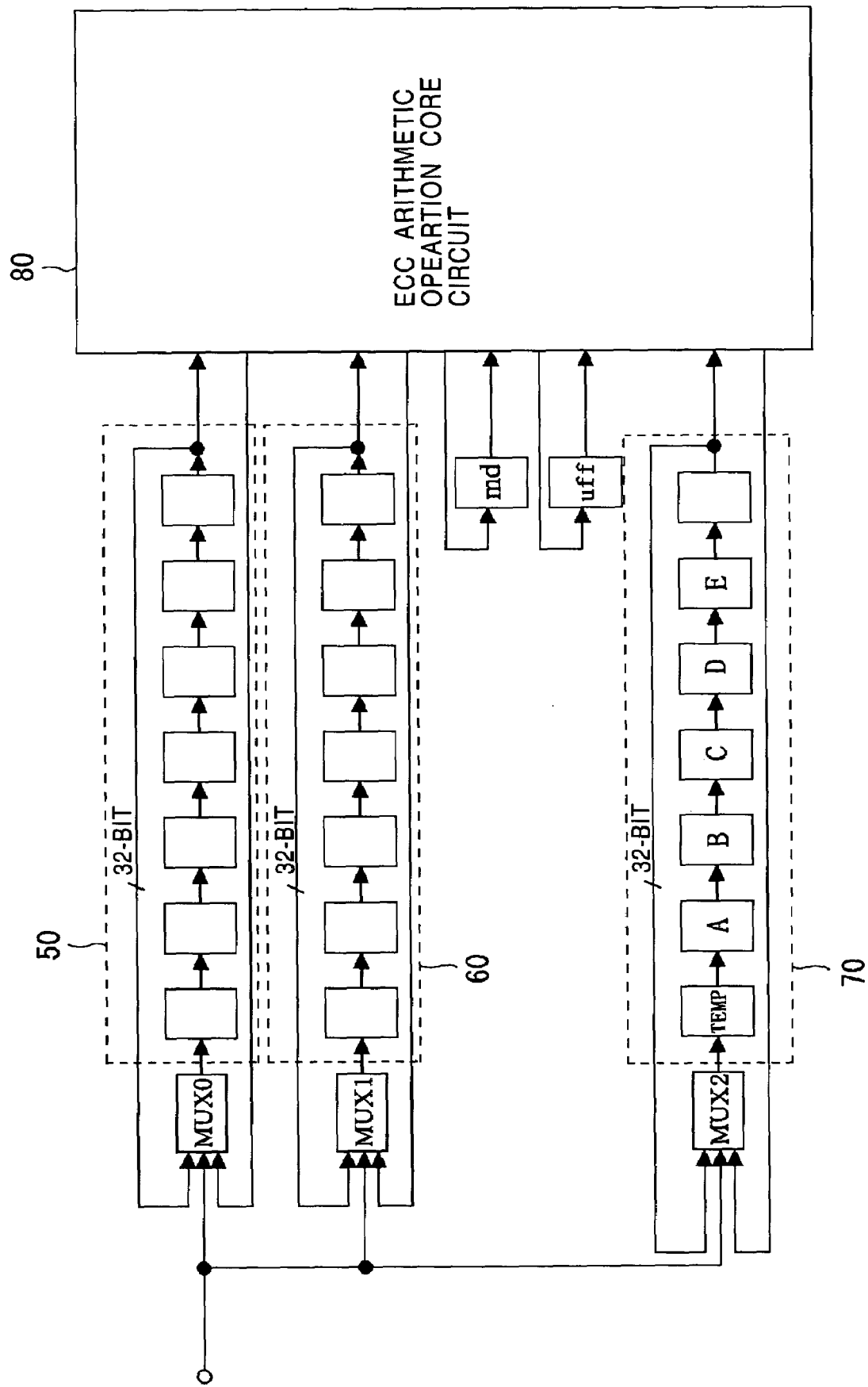
FIG. 6 is a block diagram of a specific ECC processing circuit.

The ECC processing circuit performs the ECC operation. The ECC technique is one of the public key encryption algorithms in which different communication keys are used for encoding and decoding, and uses 160-bit keys to achieve equivalent performances to those of the RSA (Rivest-Shamir-Adleman) technique using 1024-bit keys. In the encryption apparatus, the ECC processing circuit employs the so-called Montgomery (Montgomery) algorithm. As shown in FIG. 6, the ECC processing circuit includes 32-bit shift register groups 50 and 60 for temporarily storing arithmetic operation values supplied from a CPU (not shown); a shift register group 70 for storing results; and an ECC arithmetic operation core circuit 80 having an internal adder, subtractor, and multiplier (not shown) with inputs having a bit width of, mostly, 32. FIG. 6 also shows bus switches MUX0, MUX1, and MUX2.

The ECC processing circuit shown in FIG. 6 employs a special technique called the Montgomery algorithm to increase the processing speed and to reduce the circuit size. The ECC arithmetic operation core circuit 80 using the Montgomery algorithm has a combination of, mainly, an adder, a subtractor, and a multiplier, and performs each arithmetic operation step on data having a bit width of 32. In the encryption apparatus, as described above, the adder of the ECC arithmetic operation core circuit 80 and the adder of the SHA-1 processing circuit are shared in order to reduce the circuit size.

In the Montgomery ECC arithmetic operation core circuit 80 and the SHA'1 processing circuit, the operation time required for the shared multiplier is longer than the operation time required for the adder and subtractor. This causes a delay of processing, which suppresses sharp peaks of the consumption power for the gates, thus reducing the instantaneous power of the gates.

The three 32-bit shift register groups 50, 60, and 70 of the ECC processing circuit switch the bus switches MUX0, MUX1, and MUX2 to make variable the bit width of the shift register groups 50, 60, and 70, respectively, in order to support, for example, the bit width of 160, 192, or 224. In other words, each of the three 32-bit shift register groups 50, 60, and 70 of the ECC processing circuit can have five, six, or seven stages so as to support the bit width of 160, 192, or 224.

Figure 7A:
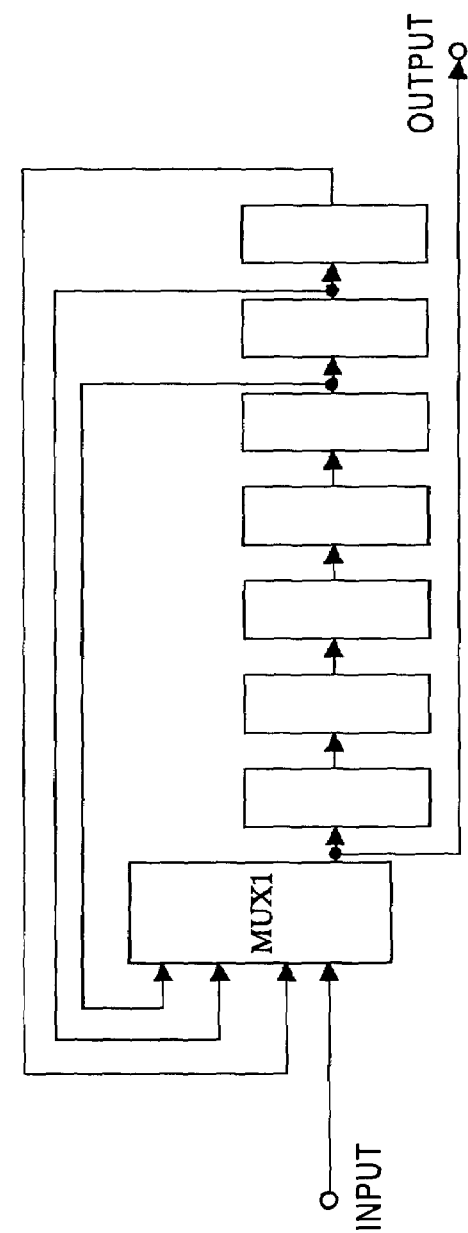
Figure 7B:
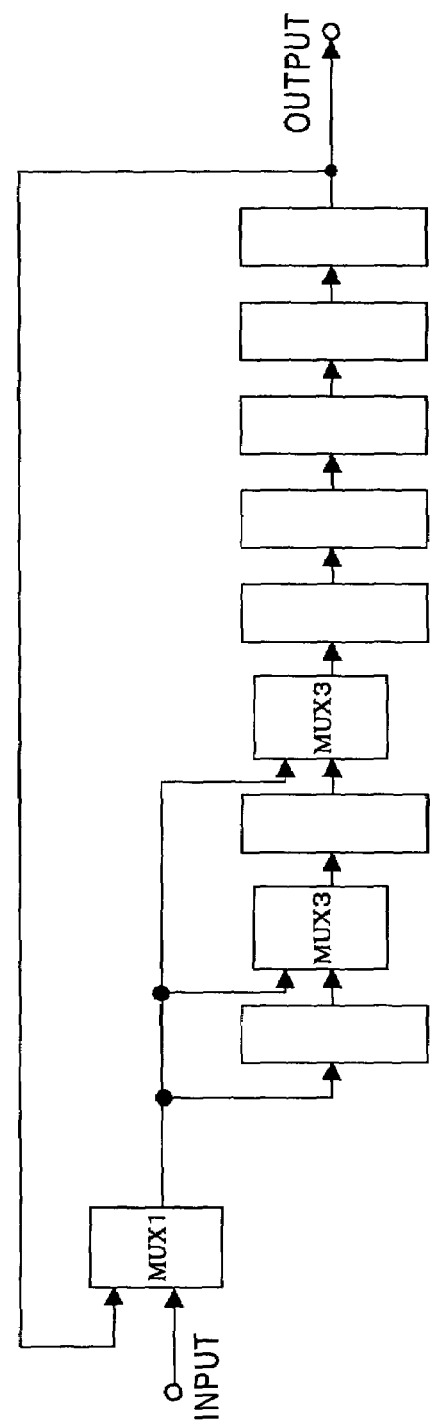

This structure is specifically described below with reference to FIG. 7A, which shows the main portion in the vicinity of the shift register group 60. In FIG. 7A, one of the signals output from the input port, the fifth-stage shift register, the sixth-stage shift register, and the seventh-stage shift register is selected to be output from the bus switch MUX1, so that the number of shift registers of the shift register group 60 can be reduced from the rightmost shift register. FIG. 7B shows another specific example of this structure. In FIG. 7B, a bus switch MUX1 outputs one of the signals output from the input port and the seventh-stage shift register. The shift register group 60 shown in FIG. 7B further includes a bus switch MUX2 after the first-stage shift register, and a bus switch MUX3 after the second-stage shift register. These additional bus switches allow the number of shift registers of the shift register group 60 to be reduced from the leftmost shift register. The shift register groups 50 and 70 of the ECC processing circuit may have similar structure.

Accordingly, the ECC processing circuit includes the bus switches MUX0, MUX1, and MUX2 corresponding to the three 32-bit shift register groups 50, 60, and 70, respectively, to make variable the bit width of each shift register group. In order to reduce the circuit size of the encryption apparatus, as described above, the shift register groups 50, 60, and 70 may be shared between the ECC processing circuit and the SHA-1 processing circuit, and the bus switches MUX0, MUX1, and MUX2 may also be shared between the ECC processing circuit and the SHA-1 processing circuit.

The SHA-1 processing circuit having the structure shown in FIG. 3 can use a 32-bit shift register group. In this SHA-1 processing circuit, shift registers for storing the target hash values and values obtained during the arithmetic operations may be replaced with an ALU RAM, as shown in FIG. 2. Since the ECC processing circuit also includes an ALU RAM (not shown) for use in arithmetic operation, an ALU RAM can be shared between the SHA-1 processing circuit and the ECC processing circuit. This reduces the circuit size of the encryption apparatus, and also allows the hash values for use in the subsequent ECC operation to be immediately stored into the ALU RAM without data transfer, thus increasing the processing speed.

The consumption power for the ECC processing circuit or the SHA'1 processing circuit to access the ALU RAM in order to store the values obtained by the ECC processing circuit or the target hash values or values obtained by the SHA'1 processing circuit into the ALU RAM exhibits a higher peak than the consumption power for these encryption processing circuits to perform other signal processing. As described below, the gates through which the ECC processing circuit or the SHA'1 processing circuit receives data from the CPU or RAM are controlled to limit other operations than accessing the ALU RAM, and accessing the ALU RAM and the other operations are performed in a time-shared manner. This reduces peaks of the consumption power for the encryption processing circuit.

The limitation on the gates to the ECC processing circuit or the SHA'1 processing circuit allows independent operations of the ECC and SHA'1 processing circuits without reception of data relating to the instruction of the CPU. This reduces the instantaneous power of the overall encryption processing apparatus, thus reducing the need for performing the required operations again when the instantaneous power is over the power limit, while increasing the processing speed.

Finally, a DES processing circuit as hardware for performing the DES operation is described.

The DES processing circuit performs the DES operation. The DES technique is one of the common key encryption algorithms in which an identical communication key is used for encoding and decoding. As used herein, the DES processing circuit employs the so-called triple-DES algorithm.

The DES processing circuit using the triple-DES algorithm requires a larger shift register group, in which key data is stored, than a DES processing circuit using the standard single-DES algorithm. The DES processing circuit using the triple-DES algorithm further requires another shift register group for DES chaining on bit strings, called the CBC (Cipher Block Chaining) mode. Assuming that the required shift register group is converted into gates, a large number of gates are required compared to the substitution boxes or S-boxes, thus increasing the circuit size of the overall encryption apparatus.

The triple-DES operation is executed by three arithmetic operations using a single DES arithmetic operation core circuit while key data is changed into three types. When the DES processing circuit is applied to so-called Type A non-contact IC cards, the shift register group 70 of the ECC processing circuit shown in FIG. 6 is used as a shift register group for storing the key data. In this case, only a 64-bit or 32-bit bus switch must be added to the ECC processing circuit. This additional bus switch may be common to a bus switch of the ECC processing circuit, thus eliminating the need for the additional bus switch in the DES processing circuit. When the DES processing circuit is applied to so-called Type B non-contact IC cards, data of two shift registers are shifted to exchange three different types of predetermined key data each time the single-DES operation is performed, resulting in a similar operation to the operation of the Type A cases. Since the shift registers of the DES processing circuit, in which data and results are stored, and the shift register group of the ECC processing circuit can be shared, a few additional circuits are required for triple-DES.

Figure 8:
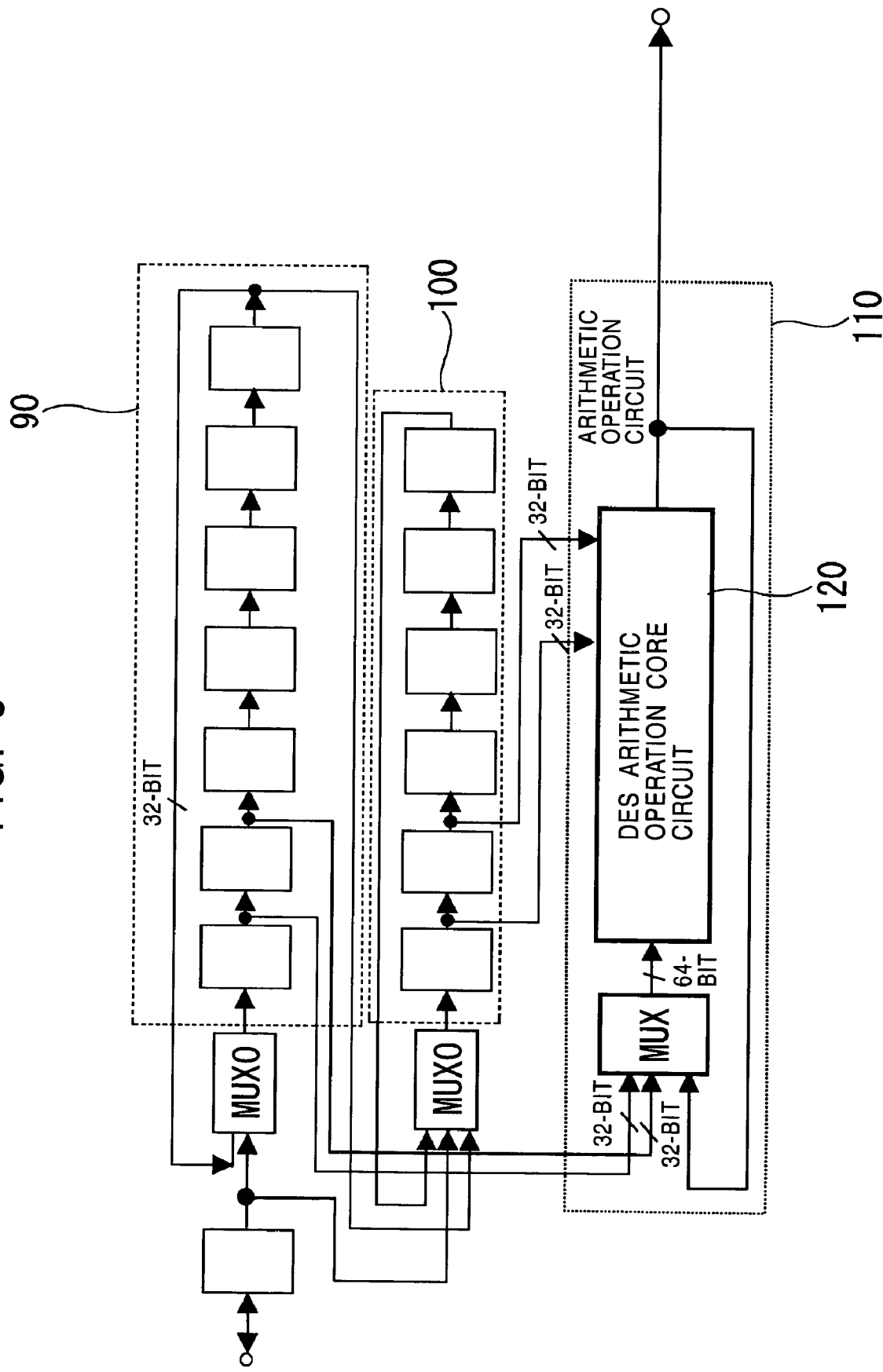
FIG. 8 is a block diagram of a specific DES processing circuit.

FIG. 8 shows a specific example of this DES processing circuit. The DES processing circuit shown in FIG. 8 includes a 32-bit shift register group 90 for storing data supplied from a CPU (not shown), a shift register group 100 for storing key data, and an arithmetic operation circuit 110 having a DES arithmetic operation core circuit 120. FIG. 8 also shows bus switches MUX and MUX0.

Typically, 64-bit buffers are required for a DES processing circuit, whereas the 32-bit shift register groups 90 and 100 suffice for the DES processing circuit of the present invention. The DES processing circuit uses circulation rather than a bus switch to exchange the key data in the triple-DES operation, and no bus switch is required. Accordingly, the DES processing circuit requires few additional circuits to the ECC processing circuit, except for the arithmetic operation circuit 110 having the DES arithmetic operation core circuit 120, thus greatly reducing the circuit size.

The SHA-1, ECC, and DES processing circuits having a structure in which components are easily shared have been described. Next, an encryption apparatus into which the SHA-1 processing circuit, the ECC processing circuit, and the DES processing circuit are integrated is described.

The SHA-1 processing circuit shown in FIG. 2, the ECC processing circuit shown in FIG. 6, and the DES processing circuit shown in FIG. 8 have many common components. The encryption apparatus with shared hardware configuration is shown in FIG. 9.

Figure 9:
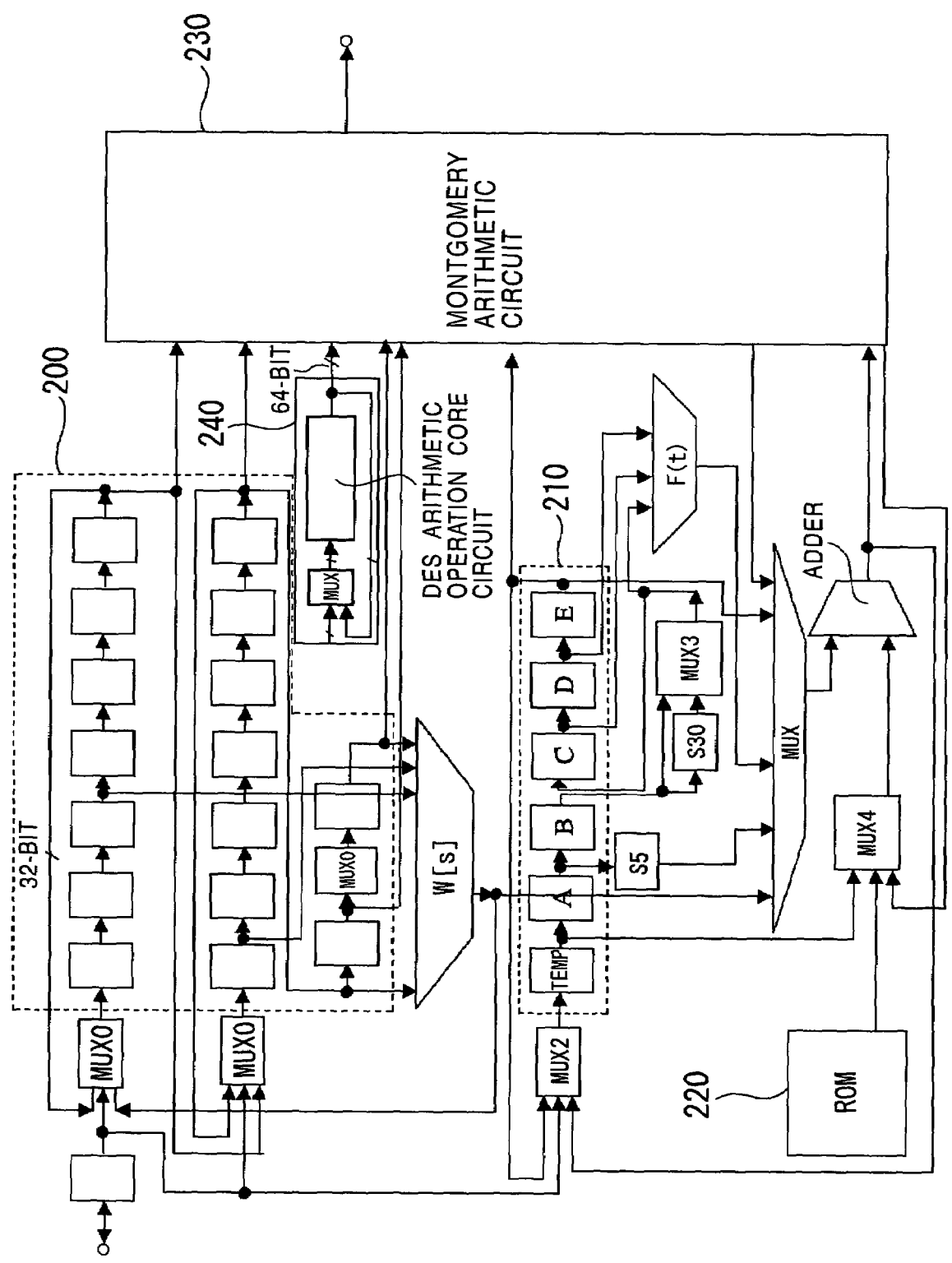
FIG. 9 is a block diagram showing the structure of the encryption apparatus.

The encryption apparatus shown in FIG. 9 includes two shift register groups 200 and 210; a ROM 220 corresponding to the ROM 30 of the SHA-1 processing circuit shown in FIG. 2; a Montgomery arithmetic circuit 230 functioning as the ALU RAM 40 of the SHA-1 processing circuit shown in FIG. 2 and the ECC arithmetic operation core circuit 80 of the ECC processing circuit shown in FIG. 6; an arithmetic operation circuit 240 corresponding to the arithmetic operation circuit 110 of the DES processing circuit shown in FIG. 8; and the above-described arithmetic operation circuits for performing the SHA-1 arithmetic operations. In FIG. 9, connection between the shift register group 200 and the arithmetic operation circuit 240 is not shown.

In the encryption apparatus, the shift register group 10 of the SHA-1 processing circuit shown in FIG. 2, the shift register groups 50 and 60 of the ECC processing circuit shown in FIG. 6, and the shift register groups 90 and 100 of the DES processing circuit shown in FIG. 8 are shared as the shift register group 200. The shift register group 20 of the SHA-1 processing circuit shown in FIG. 2 and the shift register group 70 of the ECC processing circuit shown in FIG. 6 are shared as the shift register group 210.

In the encryption apparatus shown in FIG. 9, the Montgomery arithmetic circuit 230 is connected with the SHA-1 adder via a bus switch MUX. Thus, the ECC adder can be removed.

In the encryption apparatus shown in FIG. 9, the bus switch MUX0 of the SHA-1 processing circuit shown in FIG. 2, the bus switch MUX0 of the ECC processing circuit shown in FIG. 6, and the bus switch MUX0 of the DES processing circuit shown in FIG. 8 are shared. The bus switch MUX1 of the ECC processing circuit shown in FIG. 6 and the bus switch MUX0 of the DES processing circuit shown in FIG. 8 are also shared.

In the encryption apparatus, therefore, some components are shared among the SHA-1 processing circuit, the ECC processing circuit, and the DES processing circuit, and the hardware is switched in a time-sharing manner depending upon each of the operation modes described below. This reduces the number of required gates by about one half, thus reducing the circuit size. The reduced circuit size allows the consumption power of the encryption apparatus to be reduced by about one half.

As described below, during accessing an ALU RAM, other operations are limited, thus reducing the instantaneous power of the overall encryption processing apparatus. Since the instantaneous power for accessing the ALU RAM, in which the results of the ECC processing circuit or the SHA-1 processing circuit and the resulting hash values are stored, is higher than the instantaneous power for other operations, the hardware is operated in a time-shared manner depending upon the operation mode, thus reducing peaks of the instantaneous power. This reduces the need for performing the required operations again when the instantaneous power is over the power limit, thus increasing the processing speed.

The encryption apparatus further reduces the load on a CPU (not shown) for controlling the components. For example, in the encryption apparatus, the area of the ALU RAM into which the hash values obtained in SHA-1 operation are stored may be defined in advance at an address for use in ECC operation. This facilitates the ECC operation immediately after hash value generation in the SHA-1 operation, and most of the series of operations, including signature generation and signature authentication, can be executed by hardware at high speed, while reducing the load on the CPU of the encryption apparatus. The encryption apparatus further has high resistance to attacks such as software tampering. In general, the case in which transfer of results of arithmetic operation during the encryption operation is handled by the CPU is susceptible to spoofing caused by software tampering; however, the encryption apparatus of the present invention avoids such tampering because of no intervention of the CPU during arithmetic operation.

An application example of such an encryption apparatus is described below.

As described above, the encryption apparatus can be applied to non-contact IC cards.

Figure 10:
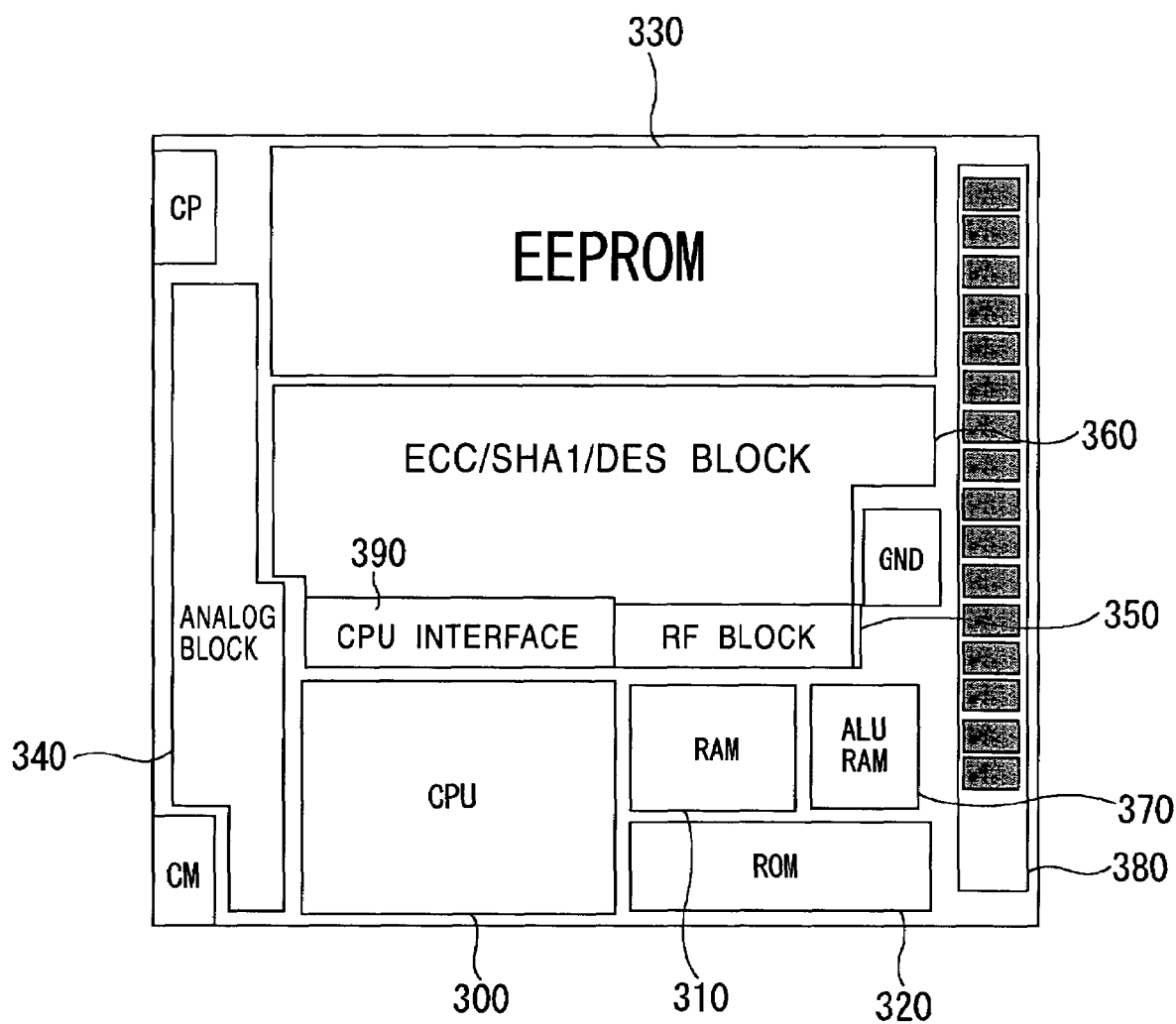
FIG. 10 is a block diagram of a non-contact IC card incorporating the encryption apparatus.

FIG. 10 shows a non-contact IC card incorporating the encryption apparatus. The non-contact IC card includes a CPU 300 for controlling the components of the non-contact IC card, a RAM (random access memory) 310 serving as a work area of the CPU 300 and having a capacity of, for example, about 2 KB, a ROM (read-only memory) 320 for storing various programs etc., and having a capacity of, for example, 32 KB, an EEPROM (electrically erasable programmable read-only memory) 330 having a capacity of, for example, about 9 KB, an analog block 340 including a power supply circuit etc., an RF (radio-frequency) block 350 for performing wireless communication, an ECC/SHA1/DES block 360 corresponding to the above-described encryption apparatus for performing the ECC, SHA-1, and triple-DES operations, an ALU RAM 370 having a capacity of, for example, about 1 KB, a test block 380 having lands used as a tester, and a CPU interface 390 which is a bus through which data is transmitted and received between the CPU 300 and each component. These components of the non-contact IC card are formed into an integrated circuit called LSI (large scale integration).

The non-contact IC card incorporates the encryption apparatus shown in FIG. 9 as the ECC/SHA1/DES block 360. The non-contact IC card activates the ECC/SHA1/DES block 360 under the control of the CPU 300 to perform the ECC, SHA-1, and triple-DES operations. As described above, the hardware of the non-contact IC card is switched in a time-shared manner depending upon the operation mode.

Figure 11:
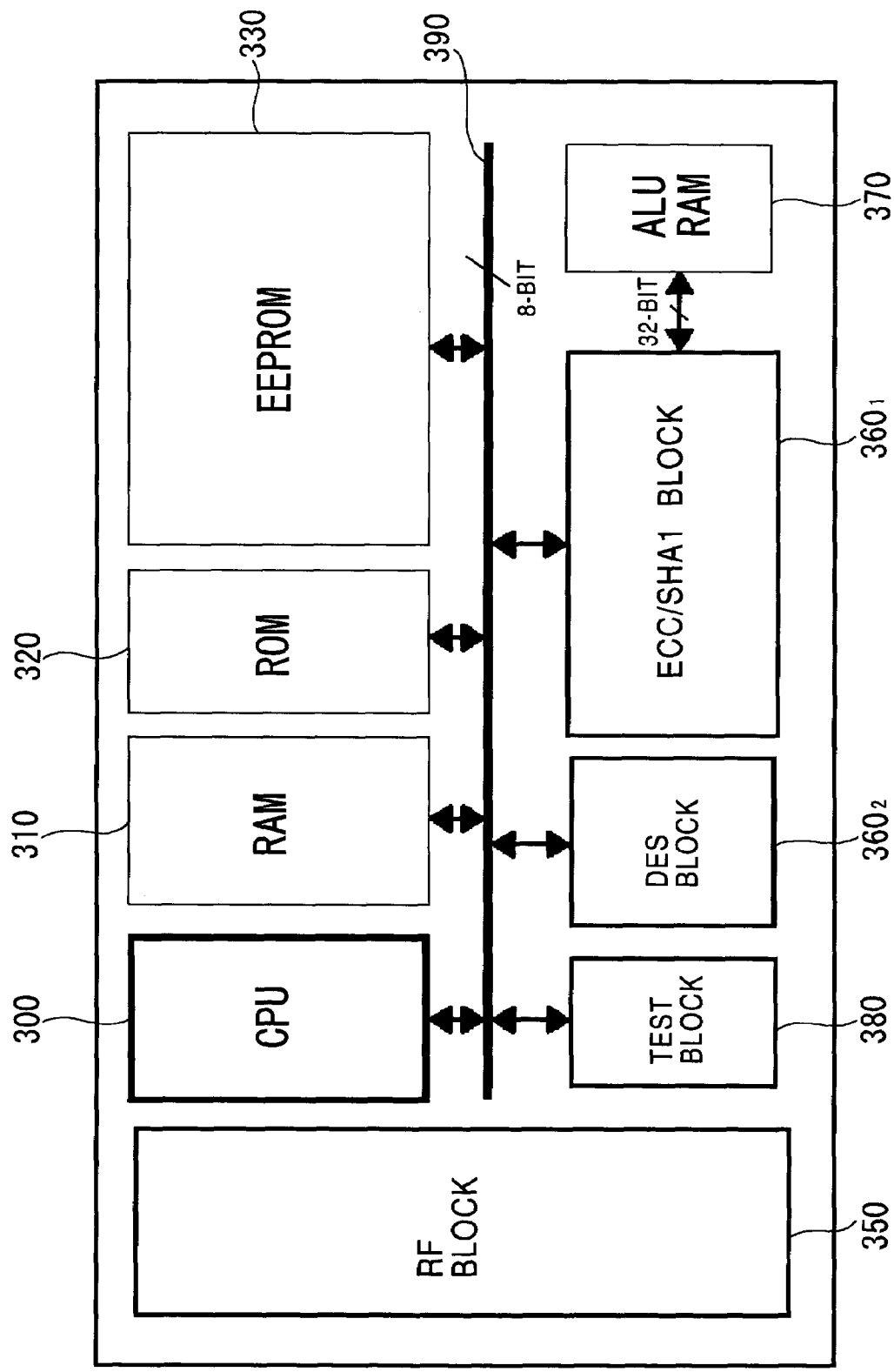
FIG. 11 is a block diagram showing functions of the non-contact IC card.

The time-shared processing of the non-contact IC card is specifically described with reference to FIG. 11, which shows the functions of the components of the non-contact IC card. In FIG. 11, the analog block 340 is not shown, and the ECC/SHA1/DES block 360 is divided into an ECC/SHA1 block $360_1$ having the ECC and SHA-1 functions, and a DES block $360_2$ having the triple-DES function, in order to aid understanding.

The non-contact IC card generally has four operation modes, i.e., a communication mode for communication, an ECC mode for ECC processing, a DES mode for triple-DES processing, and an ALU RAM mode for accessing the ALU RAM 370.

Figure 12A:
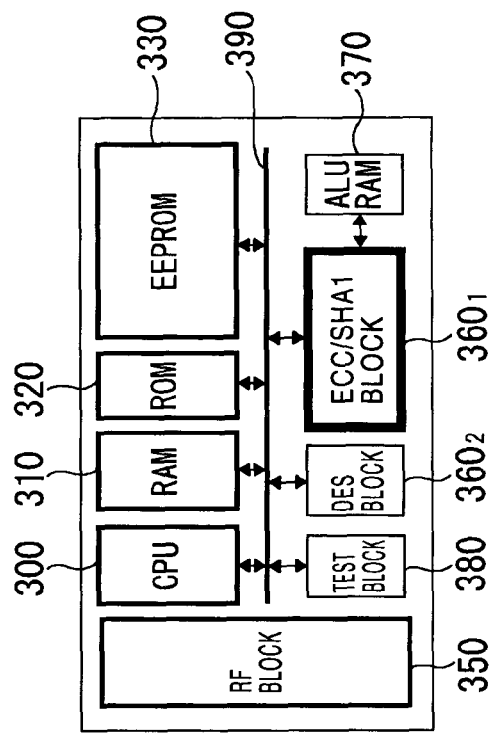

When the non-contact IC card is in the communication mode, the blocks shown in FIG. 12A by thick lines, namely, the CPU 300, the RAM 310, the ROM 320, the EEPROM 330, and the RF block 350, are activated. Specifically, when the non-contact IC card is in the communication mode, a predetermined communication program stored in the ROM 320 is initiated under the control of the CPU 300 to send various information stored in the RAM 320 or the EEPROM 330 to the outside via the RF block 350 and also to store various information received from the outside via the RF block 350 into the RAM 320 or the EEPROM 330. In the communication mode, the encryption engine does not operate processing, and the consumption power for the overall non-contact IC card is substantially equivalent to the consumption power in the communication mode. In other words, the communication mode, the ECC mode, the triple-DES mode, and the ALU RAM mode do not occur at the same time, and the consumption power for the overall non-contact IC card in the communication mode is defined only by the power consumption in the communication mode. Thus, the consumption power for the non-contact IC card can be reduced, and the operations can be carried out so that the instantaneous power of the overall non-contact IC card, which indicates the sum of the power consumptions for each operation mode at the same time, does not exceed the power limit.

Figure 12B:
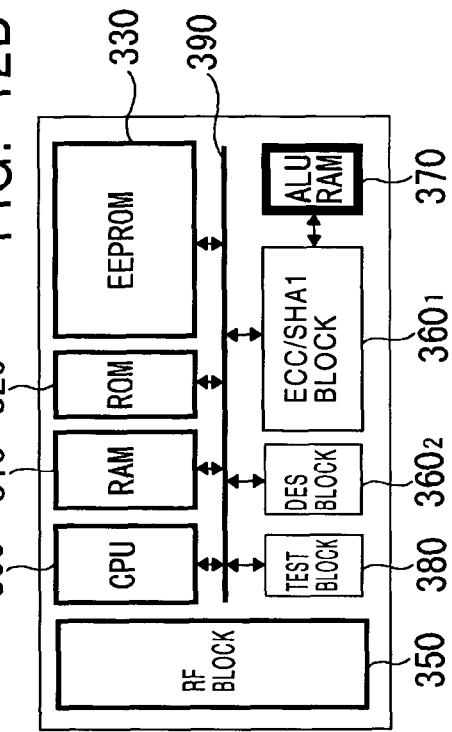

When the non-contact IC card is in the ECC mode, the block shown in FIG. 12B by thick line, namely, the ECC/SHA1 block $360_1$, is activated. Specifically, when the non-contact IC card is in the ECC mode, the SHA-1 operation is performed in the ECC/SHA1 block $360_1$ to generate hash values. In the ECC mode, the CPU 300, the RAM 310, the ROM 320, the EEPROM 330, and the RF block 350 are idle, thus preventing the hash values from being stored into the ALU RAM 370 from the ECC/SHA1 block $360_1$ or from being read from the ALU RAM 370.

In the ECC mode, the ECC/SHA1 block $360_1$ independently performs the operation without any assistance, such as an instruction sent from the CPU 300, and time-shared operations of the CPU 300, the RAM 310, the ROM 320, the EEPROM 330, and the RF block 350 are realized. The consumption power for each operation can be reduced. During the arithmetic operation of the ECC/SHA1 block $360_1$, the hash values are not delivered between the ECC/SHA1 block $360_1$ and the ALU RAM 370, and the arithmetic operation of the ECC/SHA1 block $360_1$ is once shut down in order to store or read the hash values into or from the ALU RAM 370. With time-shared processing of the arithmetic operation of the ECC/SHA1 block $360_1$ and accessing the ALU RAM 370, the ECC operation is performed.

Figure 12C:
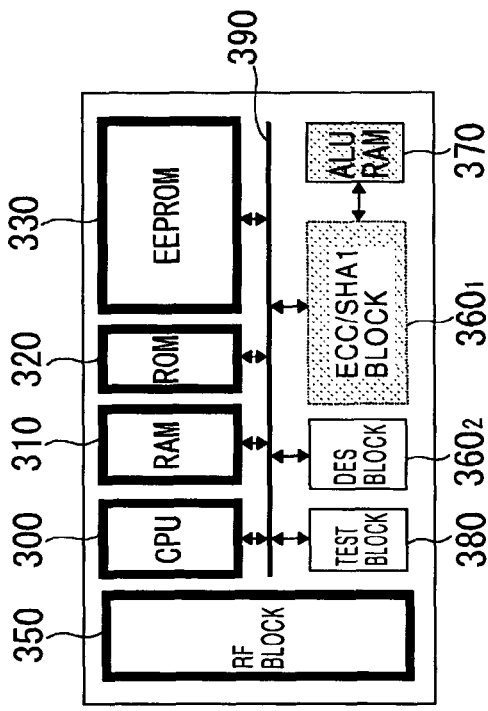

When the non-contact IC card is in the DES mode, the block shown in FIG. 12C by thick lines, namely, the DES block $360_2$, is activated. The CPU 300, the RAM 310, and the ROM 320 are idle. Specifically, when the non-contact IC card is in the DES mode, a predetermined pseudo-random number (hereinafter referred to as PN, for short) sequence stored in the ROM 320 is read as seed or key data under the control of the CPU 300, and the DES block $360_2$, the CPU 300, the ROM 320, and the RAM 310 are operated in a time-shared manner, using the RAM 310 as a work area, to perform the triple-DES operation.

Figure 12D:
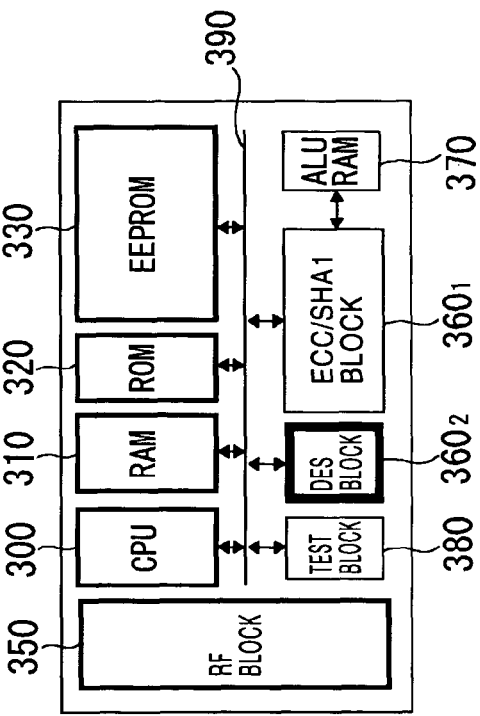

When the non-contact IC card is in the ALU RAM mode, the block shown in FIG. 12D by thick lines, namely, the ALU RAM 370, is activated so that the results generated by the ECC/SHA1 block and the data stored in the ALU RAM 370 are transferred between the ALU RAM 370 and the ECC/SHA1 block $360_1$. In activating the ALU RAM 370, the CPU 300, the RAM 310, the ROM 320, the EEPROM 330, and the RF block 350 are idle, thus preventing data transfer between the ALU RAM 370 and the ECC/SHA1 block $360_1$ to reduce the consumption power. For example, in the ECC/SHA1 block $360_1$, a mute circuit may be connected with the relatively-high-power-consumption multiplier, thus reducing the power consumption.

Figure 13A:
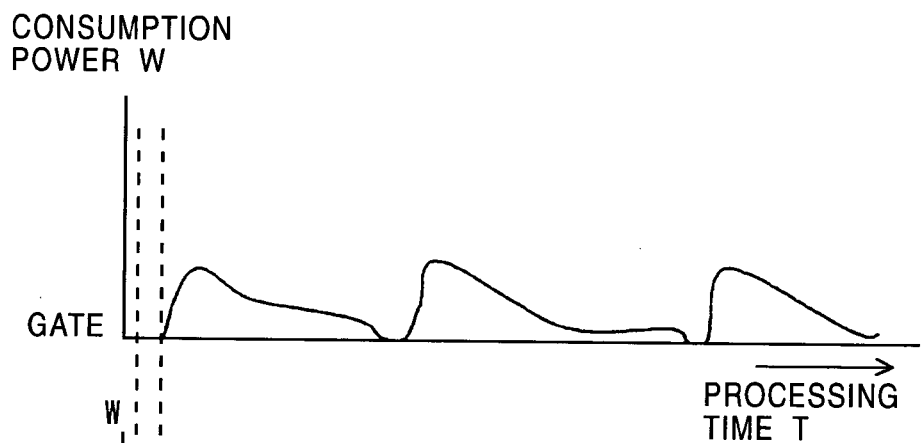
Figure 13B:
Figure 13C:
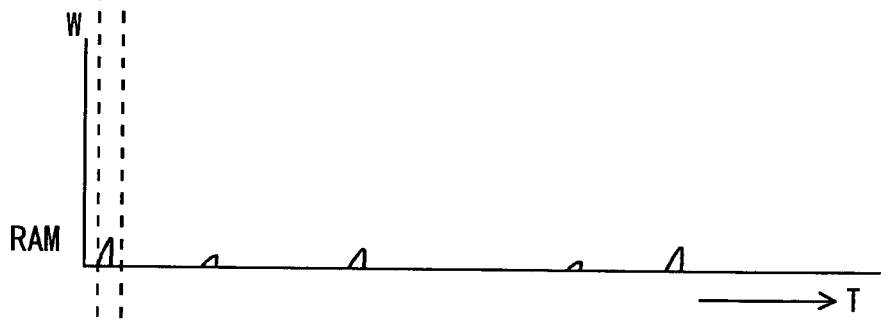
Figure 13D:
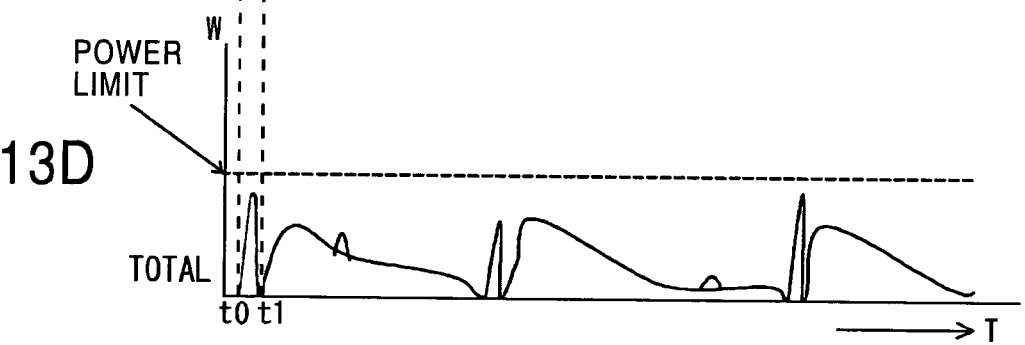

FIGS. 13A through 13D are graphs showing, for comparison, the consumption power for the above-described operation modes. In the graphs shown in FIGS. 13A through 13D, the y-axis represents the consumption power W, and the x-axis represents the processing time T. FIG. 13A shows the consumption power of the gates, FIG. 13B shows the consumption power for accessing the ALU RAM 370, FIG. 13C shows the consumption power of the RAM 310, and FIG. 13D shows the consumption power of the overall non-contact IC card, indicating the sum of the consumption powers of the gates, ALU RAM 370, and RAM 310 of the ECC/SHA1 block $360_1$. As shown in FIG. 13A, peaks of the consumption power for the gates are suppressed due to a delay of operation in the multiplier or the like, and are also distributed along the axis of processing time. This reduces the instantaneous power consumption of the gates only.

As shown in FIGS. 13A and 13B, the gates do not operate when the ALU RAM 370 is accessed, and the gates and the ALU RAM 370 do not consume power at the same time. The ALU RAM 370 consumes power at the time $t_0$ while the gates consume power at the time $t_1$; in other words, the power consumption for the gates and the power consumption for the ALU RAM 370 do not concurrently occur.

Figure 14A:
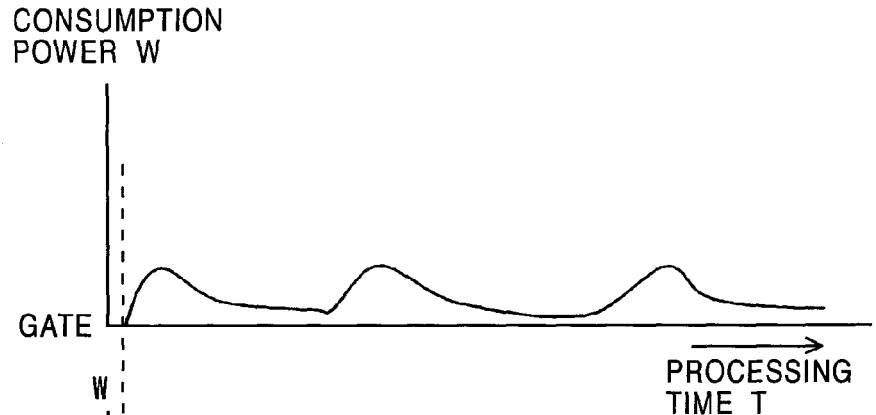
Figure 14B:
Figure 14C:

The independent operation from the CPU or RAM reduces the number of reads of data between the ECC/SHA1 block and the RAM, and the consumption power shown in FIG. 13C for the RAM is lower than the consumption power shown in FIG. 14C.

Figure 14D:
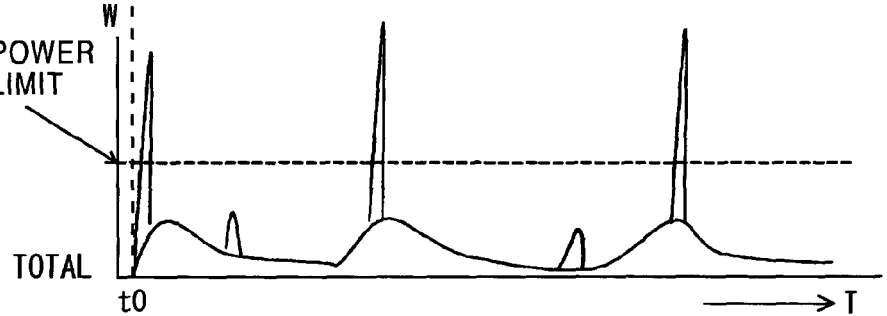

Consequently, the consumption power shown in FIG. 13D for the overall non-contact IC card, indicating the sum of consumption powers shown in FIGS. 13A through 13C, has lower instantaneous power than the consumption power shown in FIG. 14D. The non-contact IC card can be operated so that the instantaneous power consumption does not exceed a power limit of, for example, 20 mA.

In the non-contact IC card, therefore, relatively-high-power-consumption operation is performed while other operations are limited, thus reducing the instantaneous power. This does not cause a delay of operation due to the instantaneous power in excess of the power limit, thus increasing the processing speed. The hardware is switched in a time-shared manner depending upon the operation mode, thus making it possible to perform a plurality of operations, which cannot be concurrently performed even with the shared hardware configuration, and to reduce the circuit size and the power consumption.

As described above, in an encryption apparatus according to an embodiment of the present invention, accessing an ALU RAM which requires relatively high instantaneous power is performed while other arithmetic operation is limited. Other operations in an ECC/SHA1 block are performed at different timing, thus reducing the instantaneous power and increasing the processing speed.

The hardware for performing various operations is shared, and the operations are performed in a time-shared manner, thus achieving high-speed and high-security signature generation and authentication using a public key while reducing the circuit size and the power consumption.

The encryption apparatus greatly reduces the chip size of LSI in which the encryption apparatus is incorporated, and is easily applicable to non-contact IC cards etc. Due to low power consumption of the encryption apparatus, a non-contact IC card incorporating the encryption apparatus ensures a communication distance of as must as several centimeters, which is suitable for practical use, and ensures high-speed processing without the need for performing the required operations again each time the consumption power for the non-contact IC card exceeds the power limit. The encryption apparatus has high resistance to attacks such as tampering, and is effective for services with the high-security demands using a non-contact IC card.

The present invention is not limited to the foregoing embodiment. In the foregoing embodiment, the ECC technique is used as a public key encryption algorithm; however, the present invention can also be easily applied to any other public key encryption technique, such as RSA.

In the foregoing embodiment, the SHA-1 technique is used as a hash function algorithm; however, the present invention can be easily applied to any other hash function algorithm, such as MD5 (Message Digest 5).

In the foregoing embodiment, the DES technique, which is a common key encryption algorithm, is used as a random number generation technique for use in key generation of the encryption process. However, the present invention is not limited thereto, and any other random number generation technique may be used.

In the foregoing embodiment, the encryption apparatus is applied to a non-contact IC card, by way of example. It is to be understood that the present invention may also be applied to any other apparatus or device which requires similar functions.

It is to be anticipated that a variety of modifications may be made without departing from the scope of the present invention.

What is claimed is:

1. An encryption apparatus for performing an encryption operation using a public key encryption technique, said encryption apparatus comprising:
   public key encryption processing means for performing an encryption operation on data using a public key encryption technique to generate encrypted data;
   hash value generation means for generating a hash value which is used by the public key encryption processing means;
   storage means for storing the hash value; and
   control means for controlling the hash value generation means and the public key encryption processing means, the control means suppressing arithmetic operations performed by the public key encryption processing means when the hash value generation means accesses the storage means.

2. An encryption apparatus according to claim 1, wherein the public key encryption processing means includes a register group having a register for maintaining an arithmetic operation value and a register for storing a result, the hash value generation means includes a register group having a register for maintaining an arithmetic operation value and a register for storing the generated hash value, at least the register group of the public key encryption processing means and the register group of the hash value generation means are shared, and the hardware is switched in a time-shared manner depending upon the operation mode.

3. An encryption apparatus according to claim 1, further comprising:
   common key encryption processing means for performing an encryption operation using a common key encryption technique to generate a random number for use in the encryption operation of the public key encryption processing means, the common key encryption processing means including a register group having a register for maintaining the resulting data and a register for maintaining key data, wherein the register group of the common key encryption processing means and the register group of the public key encryption processing means are shared.

4. An encryption apparatus according to claim 3, wherein the common key encryption processing means performs the encryption operation using the DES technique.

5. An encryption apparatus according to claim 1, wherein the public key encryption processing means includes public key encryption arithmetic operation core means for performing various arithmetic operations for public key encryption, the hash value generation means includes hash value arithmetic operation core means for performing various arithmetic operations for hash value generation, and the public key encryption arithmetic operation core means and the hash value arithmetic operation core means are shared.

6. An encryption apparatus according to claim 5, wherein the public key encryption arithmetic operation core means includes adder means, and shares the adder means with the hash value arithmetic operation core means.

7. An encryption apparatus according to claim 1, wherein the public key encryption processing means includes a bus switch for making the bit width variable, and the public key encryption processing means shares the bus switch with the hash value generation means.

8. An encryption apparatus according to claim 7, further comprising:
   common key encryption processing means for performing an encryption operation using a common key encryption technique to generate a random number for use in the encryption operation of the public key encryption processing means, the common key encryption processing means including a bus switch, wherein the bus switch of the common key encryption processing means and the bus switch of the public key encryption processing means are shared.

9. An encryption apparatus according to claim 1, wherein the hash value generation means stores the generated hash value into the storage means at an address which is used by the public key encryption processing means, and the public key encryption processing means reads the hash value stored in the storage means.

10. An encryption apparatus according to claim 1, wherein the public key encryption processing means performs the encryption operation using the elliptic curve cryptosystem technique.

11. An encryption apparatus according to claim 1, wherein the hash value generation means performs an operation using the SHA-1 technique.

12. An encryption apparatus according to claim 1, wherein the encryption apparatus is incorporated in a non-contact IC card having a communication function.

13. An encryption apparatus for performing an encryption operation using a public key encryption technique, said encryption apparatus comprising:
- a public key encryption processing unit configured to perform an encryption operation on data using a public key encryption technique to generate encrypted data;
- a hash value generation unit configured to generate a hash value which is used by the public key encryption processing unit;
- a storage unit configured to store the hash value; and
- a control unit configured to control the hash value generation unit and the public key encryption processing unit, the control unit configured to suppress arithmetic operations performed by the public key encryption processing unit when the hash value generation unit accesses the storage unit.

14. An encryption apparatus according to claim 13, wherein the public key encryption processing unit includes a register group having a register configured to maintain an arithmetic operation value and a register configured to store a result, the hash value generation unit includes a register group having a register configured to maintain an arithmetic operation value and a register configured to store the generated hash value, at least the register group of the public key encryption processing unit and the register group of the hash value generation unit are configured to be shared, and the hardware is configured to be switched in a time-shared manner depending upon the operation mode.

15. An encryption apparatus according to claim 13, further comprising:
- a common key encryption processing unit configured to perform an encryption operation using a common key encryption technique to generate a random number for use in the encryption operation of the public key encryption processing unit, the common key encryption processing unit including a register group having a register configured to maintain the resulting data and a register configured to maintain key data, wherein the register group of the common key encryption processing unit and the register group of the public key encryption processing unit are shared.

16. An encryption apparatus according to claim 15, wherein the common key encryption processing unit is configured to perform the encryption operation using the DES technique.

17. An encryption apparatus according to claim 13, wherein the public key encryption processing unit includes a public key encryption arithmetic operation core unit configured to perform various arithmetic operations for public key encryption, the hash value generation unit includes a hash value arithmetic operation core unit configured to perform various arithmetic operations for hash value generation, and the public key encryption arithmetic operation core unit and the hash value arithmetic operation core unit are shared.

18. An encryption apparatus according to claim 17, wherein the public key encryption arithmetic operation core unit includes an adder, and public key encryption arithmetic operation core unit is configured to share the adder with the hash value arithmetic operation core unit.

19. An encryption apparatus according to claim 13, wherein the public key encryption processing unit includes a bus switch for making the bit width variable, and the public key encryption processing unit is configured to share the bus switch with the hash value generation unit.

20. An encryption apparatus according to claim 19, further comprising:
- a common key encryption processing unit configured to perform an encryption operation using a common key encryption technique to generate a random number for use in the encryption operation of the public key encryption processing unit, the common key encryption processing unit including a bus switch, wherein the bus switch of the common key encryption processing unit and the bus switch of the public key encryption processing unit are shared.

* * * * *